(12) United States Patent
Yamanaka et al.

(10) Patent No.: US 10,366,842 B2
(45) Date of Patent: Jul. 30, 2019

(54) DYE-SENSITIZED SOLAR CELL AND METHOD FOR MANUFACTURING THEREOF

(71) Applicant: SHARP KABUSHIKI KAISHA, Sakai, Osaka (JP)

(72) Inventors: Ryohsuke Yamanaka, Gojyo (JP); Nobuhiro Fuke, Ikoma-gun (JP); Atsushi Fukui, Kashiba (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 222 days.

(21) Appl. No.: 15/209,332

(22) Filed: Jul. 13, 2016

(65) Prior Publication Data

US 2016/0343517 A1    Nov. 24, 2016

Related U.S. Application Data

(63) Continuation of application No. 12/161,289, filed as application No. PCT/JP2006/324755 on Dec. 12, 2006.

(30) Foreign Application Priority Data

Jan. 18, 2006    (JP) ................................ 2006-010132

(51) Int. Cl.
*H01G 9/20* (2006.01)
*H01G 9/00* (2006.01)

(52) U.S. Cl.
CPC ......... *H01G 9/2063* (2013.01); *H01G 9/0029* (2013.01); *H01G 9/2022* (2013.01);
(Continued)

(58) Field of Classification Search
CPC .. H01G 9/2063; H01G 9/0029; H01G 9/2022; H01G 9/2031; H01G 9/2068
(Continued)

(56) References Cited

U.S. PATENT DOCUMENTS

| 4,927,721 A | 5/1990 | Gratzel et al. |
| 5,084,365 A | 1/1992 | Gratzel et al. |

(Continued)

FOREIGN PATENT DOCUMENTS

| JP | 2664194 | 10/1997 |
| JP | 2001-093591 | 4/2001 |

(Continued)

OTHER PUBLICATIONS

International Search Report for PCT/JP2006/324755 dated Jan. 30, 2007.

(Continued)

*Primary Examiner* — Jayne L Mershon
(74) *Attorney, Agent, or Firm* — Nixon & Vanderhye P.C.

(57) ABSTRACT

A dye-sensitized solar cell formed by layering a conductive layer; a photoelectric conversion layer in which a dye is adsorbed in a porous semiconductor layer and the layer is filled with a carrier transporting material; and a counter electrode including only a counter electrode conductive layer or including a catalyst layer and a counter electrode conductive layer on a support made of a light transmitting material, in which the photoelectric conversion layer is brought into contact with the counter electrode; the porous semiconductor layer forming the photoelectric conversion layer has two or more layers with different light scattering properties; and the two or more porous semiconductor layers are layered in an order of from a layer with lower light scattering property to a layer with higher light scattering property from a light receiving face side of the dye-sensitized solar cell.

14 Claims, 7 Drawing Sheets

(52) U.S. Cl.
CPC ......... *H01G 9/2031* (2013.01); *H01G 9/2068* (2013.01); *Y02E 10/542* (2013.01)

(58) Field of Classification Search
USPC ........................................................ 136/263
See application file for complete search history.

(56) References Cited

U.S. PATENT DOCUMENTS

| | | | |
|---|---|---|---|
| 5,821,597 A * | 10/1998 | Nakajima | H01L 31/03921 257/458 |
| 6,069,313 A | 5/2000 | Kay | |
| 6,555,741 B1 | 4/2003 | Hopkins et al. | |
| 2002/0134426 A1* | 9/2002 | Chiba | H01G 9/2031 136/263 |
| 2004/0115858 A1 | 6/2004 | Spivack et al. | |
| 2005/0067009 A1 | 3/2005 | Lee et al. | |
| 2005/0072458 A1* | 4/2005 | Goldstein | H01G 9/2031 136/251 |
| 2005/0257826 A1 | 11/2005 | Yamanaka et al. | |
| 2008/0202585 A1* | 8/2008 | Yamanaka | H01G 9/2031 136/263 |
| 2008/0308155 A1 | 12/2008 | Fukui et al. | |

FOREIGN PATENT DOCUMENTS

| | | | |
|---|---|---|---|
| JP | 2002-352869 | | 6/2002 |
| JP | 2002-540559 | | 11/2002 |
| JP | 2002-367686 | | 12/2002 |
| JP | 2003-217688 | | 7/2003 |
| JP | 2005-158709 | | 6/2005 |
| JP | WO 2005/069424 | * | 7/2005 |
| JP | 2005-228614 | | 8/2005 |
| JP | 2005-235725 | | 9/2005 |
| JP | 2005-294002 | | 10/2005 |
| JP | 2005-353295 | | 12/2005 |
| JP | 2005-353296 | | 12/2005 |
| WO | WO 97/16838 | | 5/1997 |
| WO | WO 2006/013830 | | 2/2006 |

OTHER PUBLICATIONS

Meng et al "Fabrication of an Efficient Solid-State Dye-Sensitized Solar Cell", Langmuir, vol. 19 issue 9, pp. 3572-3574 (2003).
Shuji Hayase et al. "Manufacturing of Dye Sensitized Solar Cells on Larger Scale" (2003), pp. 205-217.

* cited by examiner

DYE-SENSITIZED SOLAR CELL AND METHOD FOR MANUFACTURING THEREOF

This application is a continuation of U.S. application Ser. No. 12/161,289, filed Jul. 17, 2008, which is the U.S. national phase of International Application No. PCT/JP2006/324755, filed Dec. 12, 2006, which designated the U.S. and which claims priority to Japanese Application No. 2006-010132, filed Jan. 18, 2006, the entire contents of each of which are hereby incorporated by reference.

TECHNICAL FIELD

The present invention relates to a dye-sensitized solar cell and a dye-sensitized solar cell module.

BACKGROUND ART

As an energy source in place of fossil fuel, solar cells capable of converting sun light to electric power have drawn attention. Presently, some of solar cells using crystalline silicon substrates and thin film silicon solar cells have been used practically. However, the former has a problem of a high production cost of the silicon substrates and the latter has a problem that the production cost is increased since various kinds of gases for semiconductor production and complicated production facilities are required. Therefore, in both solar cells, it has been tried to lower the cost per electric power output by increasing the efficiency of photoelectric conversion; however, the above-mentioned problems still remain while being unsolved.

As a new type solar cell, there has been proposed a wet type solar cell based on photo-induced electron transfer of a metal complex (see Japanese Patent No. 2664194; Patent Document 1).

This wet type solar cell comprises: two glass substrates each of which has an electrode on a surface thereof; and a photoelectric conversion layer which contains a photoelectric conversion material having an absorption spectrum in a visible light region by adsorbing a photo-sensitive dye and an electrolytic material and which is sandwiched between the electrodes of two glass substrates. Specifically, as shown in FIG. 9, the dye-sensitized solar cell is produced by injecting an electrolytic solution between two glass substrates. In the drawing, a reference numeral 100 denotes a first support (glass substrate); a reference numeral 101 denotes a second support (glass substrate); a reference numeral 102 denotes a conductive layer; a reference numeral 103 denotes a sealing material; a reference numeral 104 denotes a photoelectric conversion layer; a reference numeral 105 denotes a catalyst layer; a reference numeral 106 denotes a counter conductive layer; and a reference numeral 107 denotes a carrier transporting layer (electrolytic solution).

When the wet type solar cell is irradiated with light, electrons are generated in the photoelectric conversion layer, the generated electrons transfer to the electrodes through an external electric circuit, and the transferred electrons are conveyed to the electrodes opposed owing to the ion in the electrolytic material and turn back to the photoelectric conversion layer. Owing to the series of the flow of the electrons, electric energy is outputted.

However, since a basic structure of the dye-sensitized solar cell described in Patent Document 1 is a structure that the electrolytic solution is injected between the opposed transparent conductive film-bearing glass substrates, it is possible to produce a trial solar cell with a small surface area, but it is difficult to practically produce a solar cell with a large surface area such as 1 m square. That is, if one solar cell is enlarged in the surface area, the generated current is increased proportional to the area. However, since a voltage decrease in the plane direction of the transparent conductive film to be used for the electrode parts is increased, the inner resistance in series of the solar cell is increased. As a result, FF (fill-factor) and a short circuit current at the time of the photoelectric conversion are lowered, resulting in a problem of decrease of the photoelectric conversion efficiency.

Further, since the dye-sensitized solar cell module is produced by forming elements between the opposed transparent conductive film-bearing glass substrates, the module has problems that the production cost is increased and the weight is increased.

In order to solve the problems on the inner resistance in series, there has been proposed a dye-sensitized solar cell module having a plurality of dye-sensitized solar cells connected in series (see Japanese Unexamined Patent Publication No. 2002-540559: Patent Document 2).

In this dye-sensitized solar cell module as shown in FIG. 10, a glass substrate 110 bearing a transparent conductive film (electrode) 112 formed in a comb-like shape by patterning and a glass substrate 111 bearing a transparent conductive film (electrode) 116 and a catalyst layer 115 formed successively in a comb-like shape by patterning are stuck to each other in a manner that an insulating layer 113 is interposed between the glass substrates so as to form respective dye-sensitized solar cells and also a conductive path (contact layer) 118 for electrically connecting a catalyst layer 115 and the transparent conductive films 112 and 116 is arranged so as to connect neighboring dye-sensitized solar cells in series and furthermore a photoelectric conversion layer 114 and an electrolytic solution 117 are sandwiched between the glass substrates.

Further, a dye-sensitized solar cell module having W-type series connection proposed by P. M. Sommeling et al., is described in "Development Technology of Dye-Sensitized Solar Cells", edited by HAYASE Shuji and FUJISHIMA Akira, Gijutsu Kyoiku, p. 205-217, June 2003 (Non-Patent Document 1).

In this dye-sensitized solar cell module as shown in FIG. 11, a porous semiconductor layer which is a photoelectric conversion layer 214 and platinum which is a catalyst layer 215 are alternately formed on two glass substrates 210 and 211 bearing transparent conductive films (electrodes) 212 and 216 formed in a comb-like shape by patterning and are stuck to each other in a state that the porous semiconductor layers and the platinum on the respective glass substrates are arranged face to face and in a manner that an insulating layer 213 of a resin, or the like, is interposed between the substrates so as to form each dye-sensitized solar cell and an electrolytic solution 217 is sandwiched between the substrates.

However, the dye-sensitized solar cell modules described in Patent Document 2 and Non-Patent Document 1 have a configuration that a basic structure of each dye-sensitized solar cell is formed by injecting the electrolytic solution between the opposed transparent conductive film-bearing glass substrates, and therefore the problems of the production cost and weight still remain while being unsolved.

Accordingly, in order to solve the problems of the production cost and weight, there has been proposed a dye-sensitized solar cell module having one transparent conductive film-bearing glass substrate and a plurality of dye-sensitized solar cells (sometimes referred to as "photovoltaic cells") connected in series and arranged on the glass substrate (e.g., see International Publication WO 97/16838: Patent Document 3).

In the dye-sensitized solar cell module as shown in FIG. 12, each dye-sensitized solar cell has a structure formed by successively layering a porous semiconductor layer (porous titanium oxide layer) 314 which is a photoelectric conversion layer, a porous insulating layer (intermediate porous insulating layer) 318, and a counter electrode 315 on a transparent substrate (glass substrate) 310 bearing a transparent conductive film (electrode) 312 formed in a comb-like shape by patterning and the dye-sensitized solar cells are arranged in a manner that the transparent conductive film 312 of one dye-sensitized solar cell and the counter electrode 315 of a neighboring dye-sensitized solar cell are brought into contact with each other, and thus both solar cells are connected in series. In the drawing, a reference numeral 311 denotes a top cover for tightly sealing an insulating liquid and a reference numeral 313 denotes an insulating layer.

Further, Japanese Unexamined Patent Publication No. 2002-367686 (Patent Document 4) discloses a dye-sensitized solar cell module having an integrated structure including a transparent conductive film, a porous semiconductor layer, a porous insulating layer, and a catalyst layer formed on a transparent substrate. This technique determines a particle diameter of component particles of each of the porous semiconductor layer, the porous insulating layer, and the catalyst layer, and thus can prevent particles of formed layers from being mixed in the porous layers each of which is an under layer when each layer is formed.

However, the dye-sensitized solar cell modules described in Patent Documents 3 and 4 are required to successively layer the porous semiconductor layer, the porous insulating layer, and the catalyst layer on one transparent conductive film-bearing glass substrate and fire the respective layer after formation of the respective layers. Therefore, the processing steps are increased and the transportation resistance of a carrier transporting material is increased due to the formation of the porous insulating layer, resulting in a problem of deterioration of the performance of the solar cell.

In general, when a catalyst layer and a porous semiconductor layer of a photoelectric conversion layer are brought into contact with each other, leakage, that is, electron injection from the photoelectric conversion layer to the catalyst layer and a counter conductive layer, occurs in the contact part. In order to prevent the leakage, it is preferable to form a Schottky barrier between the catalyst layer and the porous semiconductor layer. Accordingly, at least the catalyst layer among the counter constituent elements is preferable to have a lower work function than the conduction band energy level of the porous semiconductor layer and thus activate a redox reaction of the carrier transporting material.

As a material for forming such a catalyst layer, for example, platinum (work function: 6.35 eV) is preferable in the case of using titanium oxide (electron affinity=conduction band energy level: 4.1 eV) for the porous semiconductor layer. However, if the porous semiconductor layer and the catalyst layer are formed using fine particles, the physical values (energy levels and Schottky barrier between two type materials) of the respective materials cannot often be applied as they are. For example, in a decomposition step such as deodorization by utilizing a photocatalytic function of titanium oxide, there is a technique of increasing the photocatalytic function of titanium oxide by supporting platinum particles in a size of several nanometers on titanium oxide fine particles in a size of several ten nanometers and it is known well that electrons are shifted from titanium oxide to platinum.

Therefore, in the dye-sensitized solar cell module and dye-sensitized solar cell described in Patent Document 3 and 4, the porous insulating layer using a material with a high conduction band energy level such as zirconium oxide is formed on the porous semiconductor layer.

On the other hand, in order to make the best use of incident light to the dye-sensitized solar cell, there is a technique of forming a porous semiconductor layer in a layered state using fine particles with various particle diameters and it is confirmed that this technique can improve the performance of the solar cell (see, Japanese Unexamined Patent Publication No. 2001-93591, Patent Document 5).

In this porous semiconductor layer as shown in FIG. 13, a conductive layer 22, a porous semiconductor layer 23 adsorbing a dye, and a catalyst layer (not illustrated) are successively layered on a support 21 in an incident light (light receiving face) side. Further, in the porous semiconductor layer 23, semiconductor particles 24 with a smaller particle diameter and semiconductor particles 25 with a larger particle diameter are layered in this order, that is, in an order of from a layer with lower light scattering property to a layer with higher light scattering property, from the light receiving face side.

With respect to such a porous semiconductor layer, the light absorption probabilities in each layer of the porous semiconductor layers 23 differ. That is, the incident light from a support 21 side is successively absorbed by a dye adsorbed in the porous semiconductor layer 23 formed on the conductive layer 22 and proceeds in a catalyst layer (not illustrated) direction. Since such light absorption step is carried out in the inside of the solar cell, the dye adsorbed on a portion of the porous semiconductor layer 23 close to the support 21 most absorbs light, and as the light proceeds in the catalyst layer (not illustrated) direction, the amount of incident light is decreased more and the photoelectric conversion per unit time is lowered more.

Patent Document 1: Japanese Patent No. 2664194
Patent Document 2: Japanese Unexamined Patent Publication No. 2002-540559
Patent Document 3: International Publication WO 97/16838
Patent Document 4: Japanese Unexamined Patent Publication No. 2002-367686
Patent Document 5: Japanese Unexamined Patent Publication No. 2001-93591
Non-Patent Document 1: "Development Technology of Dye-Sensitized Solar Cells", edited by HAYASE Shuji and FUJISHIMA Akira, Gijutsu Kyoiku, p. 205-217, June 2003

DISCLOSURE OF THE INVENTION

Problems that the Invention is to Solve

The present invention aims to provide a high performance dye-sensitized solar cell having an improved FF and an enhanced short-circuit current and a dye-sensitized solar cell module using the cell at low cost.

Means for Solving the Problems

In order to solve the above-mentioned problems, the inventors of the present invention have made investigations while taking a layer structure of a porous semiconductor layer for efficiently using incident light for photoelectric conversion, a relation of energy levels of a porous semiconductor layer material and a catalyst layer material, and an electric power generation mechanism of a dye-sensitized solar cell into consideration and consequently have found that with respect to a dye-sensitized solar cell formed by layering a conductive layer, a photoelectric conversion layer in which a dye is adsorbed in a porous semiconductor layer and the layer is filled with a carrier transporting material, and a counter electrode including only a counter electrode conductive layer or including a catalyst layer and a counter electrode conductive layer on a support made of a light transmitting material, a high performance dye-sensitized solar cell having decreasing transportation resistance of a carrier transporting material, an improved FF and an enhanced short-circuit current without using a porous insulating layer, which is not required for a basic mechanism of a dye-sensitized solar cell, could be obtained by employing a structure formed by bringing the photoelectric conversion layer into contact with the counter electrode and making the porous semiconductor layer have two or more layers with different light scattering properties and layering two or more porous semiconductor layers in an order of from layers with lower light scattering property to layers with higher light scattering property from a light receiving face side of the dye-sensitized solar cell, and that production steps thereof could be shortened. Thus, the inventors have accomplished the present invention.

As described above, the present invention provides A dye-sensitized solar cell formed by layering a conductive layer; a photoelectric conversion layer in which a dye is adsorbed in a porous semiconductor layer and the layer is filled with a carrier transporting material; and a counter electrode including only a counter electrode conductive layer or including a catalyst layer and a counter electrode conductive layer on a support made of a light transmitting material, in which the photoelectric conversion layer is brought into contact with the counter electrode; the porous semiconductor layer forming the photoelectric conversion layer has two or more layers with different light scattering properties; and the two or more porous semiconductor layers are layered in an order of from a layer with lower light scattering property to a layer with higher light scattering property from a light receiving face side of the dye-sensitized solar cell.

Further, the present invention also provides a dye-sensitized solar cell module including at least two dye-sensitized solar cells including the above-mentioned dye-sensitized solar cell and connected in series.

Effects of the Invention

According to the present invention, it is possible to provide a high performance dye-sensitized solar cell having an improved FF and an enhanced short-circuit current and a dye-sensitized solar cell module using the cell at low cost.

In the present invention, since at least two porous semiconductor layers with different light scattering properties are layered in an order of from a layer with lower light scattering property to a layer with higher light scattering property from a light receiving face side of the dye-sensitized solar cell, incident light can efficiently be utilized for photoelectric conversion and a particle diameter of semiconductor particles forming the porous semiconductor layer on an opposite side of the light receiving face is increased. Since the amount of the dye adsorbed in such a porous semiconductor layer is small, the incident light is only absorbed and reflected by the semiconductor particles. In the case where the porous semiconductor layer contains titanium oxide particles, the light absorption region is about 400 nm or shorter and the incident light is absorbed by a carrier transporting material, in which redox seeds such as the titanium oxide particles of the porous semiconductor layer in the light receiving face side and iodine are dissolved, and scarcely reaches the porous semiconductor layer on the opposite side of the light receiving face.

Accordingly, in the above-mentioned configuration, due to difference of the basic energy levels, no leakage occurs and photoelectric conversion is not dominantly caused in the interface of the photoelectric conversion layer and the catalyst layer, where the leakage is expected to occur, and therefore a porous insulating layer may not be formed. However, in the case of a dye-sensitized solar cell module, the dye-sensitized solar cell of the present invention having no porous insulating layer and a conventional dye-sensitized solar cell having a porous insulating layer may be combined.

EXPLANATION OF REFERENCE NUMBERS

Figure 1:
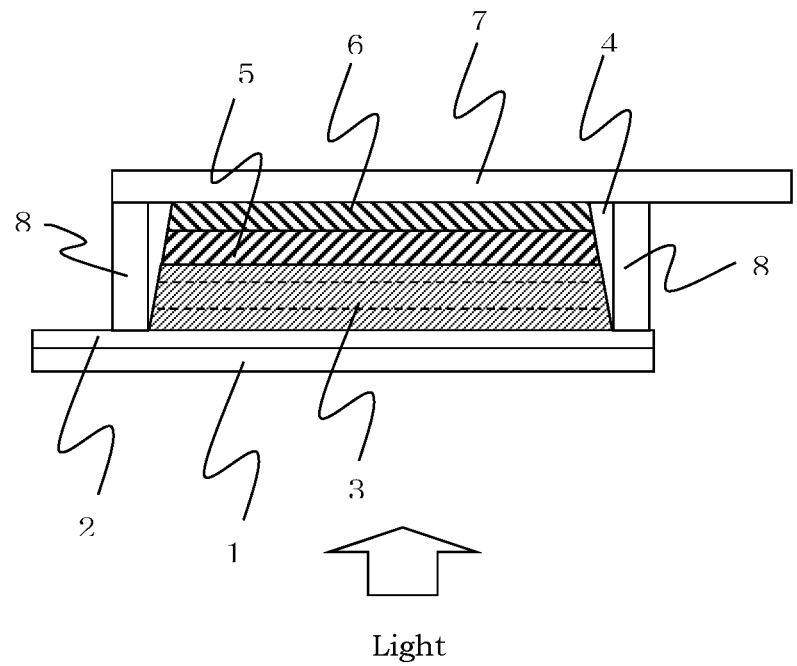
FIG. 1 is a schematic cross-sectional view of a main part showing a layer structure of a dye-sensitized solar cell according to the present invention (Production Example 1).

1, 30, 40, 50: support
31, 41, 51: cover 2, 32, 42, 52: conductive layer
3, 33, 43, 53: photoelectric conversion layer filled with a carrier transporting material
34, 44, 54: inter-cell insulating layer
4: carrier transporting material
5, 35, 45, 55: catalyst layer
6, 36, 46, 56: counter electrode conductive layer
7: output electrode
8: sealing material
57: porous insulating layer
37, 47, 58: insulating layer
21: support
22: conductive layer
23: porous semiconductor layer adsorbing dye
24: semiconductor particles with smaller particle diameter
25: semiconductor particles with larger particle diameter
100: first support (glass substrate)
101: second support (glass substrate)
102: conductive layer
103: sealing material
104: photoelectric conversion layer
105: catalyst layer
106: counter electrode conductive layer
107: carrier transporting layer (electrolytic solution)
110, 111, 210, 211: glass substrate
112, 116, 212, 216: transparent conductive film (electrode)
113, 213: insulating layer
114, 214: photoelectric conversion layer
115, 215: catalyst layer
117, 217: electrolytic solution
118: conductive path (contact axial layer)
310: transparent substrate (glass substrate)
311: top cover for tightly sealing electrical insulating liquid
312: transparent conductive film (electrode)
313: insulating layer
314: porous semiconductor layer (porous titanium oxide layer)
315: counter electrode (counter electrode)
318: porous insulating layer (intermediate porous insulating layer)

BEST MODES FOR CARRYING OUT THE INVENTION

A dye-sensitized solar cell (hereinafter, referred to as "solar cell") of the present invention is formed by layering a conductive layer, a photoelectric conversion layer in which a dye is adsorbed in a porous semiconductor layer and the layer is filled with a carrier transporting material, and a counter electrode including only a counter electrode conductive layer or including a catalyst layer and a counter electrode conductive layer on a support made of a light transmitting material, and characterized in that the photoelectric conversion layer is brought into contact with the counter electrode and the porous semiconductor layer forming the above-mentioned photoelectric conversion layer has two or more layers with different light scattering properties and the two or more porous semiconductor layers are layered in an order of from a layer with lower light scattering property to a layer with higher light scattering property from a light receiving face side of the dye-sensitized solar cell.

Further, a dye-sensitized solar cell module (hereinafter, referred to as "module") of the present invention comprises at least two solar cells including the solar cell of the present invention and connected in series.

Preferred embodiments of the solar cell of the present invention will be described with reference to drawings. These embodiments are merely examples and variation embodiments can be made within the scope of the present invention.

FIG. 1 is a schematic cross-sectional view of a main part showing the layer structure of the solar cell according to the present invention.

In FIG. 1, a reference numeral 1 denotes a support; a reference numeral 2 denotes a conductive layer; a reference numeral 3 denotes a photoelectric conversion layer filled with a carrier transporting material; a reference numeral 4 denotes a carrier transporting material; a reference numeral 5 denotes a catalyst layer; a reference numeral 6 denotes a counter electrode conductive layer; a reference numeral 7 denotes an output electrode; and a reference numeral 8 denotes a sealing material.

(Support 1)

The support is required to have light transmitting property in the portion to be a light receiving face of a solar cell and therefore is preferable to be made of at least a light-transmitting material and preferably have a thickness of about 0.2 to 5 mm.

A material forming the support is not particularly limited if it is generally useful for solar cells and capable of achieving the effects of the present invention. Examples of such a material include glass substrates of soda glass, fused quartz glass, and crystalline quartz glass, heat resistant resin sheets such as a flexible film, and the like.

Examples of a material composing the flexible film (hereinafter, referred to as "film") may include, for example, tetraacetyl cellulose (TAC), poly(ethylene terephthalate) (PET), poly(phenylene sulfide) (PPS), polycarbonate (PC), polyallylate (PA), poly(ether imide) (PEI), a phenoxy resin, and Teflon (registered trademark).

In the case where other layer is formed on the support by heating, for example, in the case where a conductive layer is formed on the support by heating at about 250° C., Teflon (registered trademark) having heat resistant at a temperature of 250° C. or more is particularly preferable among the film materials.

Further, a support 1 may be used when a completed solar cell is attached to other constructions. That is, it is made easy to attach the peripheral parts of the support such as a glass substrate to other supports by using metal processing members and screws.

(Conductive Layer 2 and Counter Electrode Conductive Layer 6)

In the case where a conductive layer 2 and a counter electrode conductive layer 6 form a light receiving face of a solar cell, light transmitting property is required, and therefore, at least one of the layers is made of a light transmitting material. However, the material may be a material substantially transmitting light with a wavelength to which a sensitizing dye described later has a practically effective sensitivity and thus a material to have transmitting property for light in the entire wavelength range is not required.

The light transmitting material is not particularly limited if it is generally usable for solar cells and a material capable of achieving the effects of the present invention. Examples of such a material may include indium-tin compounded oxide (ITO), fluorine-doped tin oxide (FTO), zinc oxide (ZnO), and the like.

The conductive layer 2 and the counter electrode conductive layer 6 made of the light transmitting materials are formed by layering a material layer (light transmitting conductive layer) made of a light transmitting material on a support (light transmitting substrate) made of a light transmitting material. That is, in the case of the conductive layer 2, the light transmitting substrate and the support 1 are same.

Practically, a light transmitting conductive substrate obtained by layering a light transmitting conductive layer of FTO on a light transmitting substrate (support) of soda lime float glass can be exemplified and may be used preferably in the present invention.

A method for forming the light transmitting conductive layer on the light transmitting substrate is not particularly limited and for example, a publicly known sputtering method, spraying method, and the like can be exemplified.

The thickness of the light transmitting conductive layer is preferably about 0.02 to 5 µm and the membrane resistance is more preferable as it is lower and it is preferably 40 Ω/sq or less.

The conductive layer 2 and the counter electrode conductive layer 6 not necessarily required to have the light transmitting property may be formed using the above-mentioned light transmitting material or a light un-transmitting material. Examples of the light un-transmitting material may include metal materials such as titanium, tungsten, gold, silver, copper, aluminum, nickel and the like.

Further, a metal lead wire may be formed in the conductive layer 2 to lower the resistance.

Examples of a material of the metal lead wire may include platinum, gold, silver, copper, aluminum, nickel, titanium, and the like.

A method for forming the metal lead wire may be, for example, a method for forming a metal lead wire on the support 1 by a publicly known sputtering method, vapor deposition method, or the like, and forming the conductive layer 2 on the support 1 bearing the formed metal lead wire; a method for forming the conductive layer 2 on the support 1 and forming the metal lead wire on the conductive layer 2. In this connection, in the case where formation of the metal lead wire leads to decrease of the incident light quantity from the light receiving face, the thickness of the metal lead wire is preferably set to be about 0.1 to 4 mm.

(Catalyst Layer 5)

It is preferable to form a catalyst layer 5 between a photoelectric conversion layer 3 and the counter electrode conductive layer 6. The combination of the catalyst layer 5 and the counter electrode conductive layer 6 may be referred to as "counter electrode".

The catalyst layer and the photoelectric conversion layer are brought into contact with each other without any gap therebetween, so that (1) the inner resistance can be lowered and a FF can be increased since the transfer distance of a redox molecule in an electrolytic solution in the carrier transporting layer is shorter than that in the case where the gap is present and that (2) the incident light can be efficiently utilized and the photoelectric conversion current can be increased since the light absorption can be prevented by a redox molecule in an electrolytic solution in the layer of the carrier transporting material in the gap in the case where the layer of the carrier transporting material is set nearer to the light receiving face side than the photoelectric conversion layer 3.

In general, in order to prevent leakage in the contact part of the catalyst layer and the porous semiconductor layer of the photoelectric conversion layer, that is, electron injection into the counter electrode from the photoelectric conversion layer, it is preferable to form a Schottky barrier between the catalyst layer and the porous semiconductor layer.

Accordingly, at least the catalyst layer among the constituent components of the counter electrode is preferable to have a work function lower than the conduction band energy level of the porous semiconductor layer.

Further, the catalyst layer is preferable to activate the redox reaction of a carrier transporting layer which will be described later.

The material composing the catalyst layer 5 is not particularly limited if it is commonly usable for solar cells and capable of achieving the effects of the present invention. Examples of such a material may be platinum (work function: 6.35 eV) and carbon (work function: 4.7 eV) such as carbon black, graphite, glass carbon, amorphous carbon, hard carbon, soft carbon, carbon whisker, carbon nanotube, fullerene, and the like in the case of using titanium oxide (electron affinity=conduction band energy level: 4.1 eV) for the porous semiconductor layer.

Further, in the case where the catalyst layer is closer to the light receiving face side than the photoelectric conversion layer, since the catalyst layer is required to have the light transmitting property, the catalyst layer is preferable to be thin. Although differing in accordance with the constituent material, the thickness of the catalyst layer is 0.5 to 1000 nm and preferably 0.5 to 300 nm in the case of using platinum.

In the case of using platinum, the catalyst layer can be formed by, for example, a publicly known PVC method, vapor deposition method, sputtering method, and the like and in the case of using carbon, it can be formed by an application method such as a screen printing method using a paste like material obtained by dispersing carbon in a solvent.

(Photoelectric Conversion Layer 3)

The photoelectric conversion layer 3 is formed by adsorbing a dye in a porous semiconductor layer.

(Porous Semiconductor Layer)

In the present invention, the porous semiconductor layer includes at least two layers with different light scattering properties and two or more porous semiconductor layers are layered in an order of from a layer with lower light scattering property to a layer with higher light scattering property from the light receiving face side of the dye-sensitized solar cell.

The porous semiconductor layer contains a semiconductor and may have various morphological states such as a granular state, a film-like state having a large number of fine pores, and the like and preferably the film-like state.

The semiconductor material composing the porous semiconductor layer is not particularly limited if it is generally usable for a photoelectric conversion material. Examples of such a material may include compounds such as titanium oxide, zinc oxide, tin oxide, iron oxide, niobium oxide, cerium oxide, tungsten oxide, nickel oxide, strontium titanate, cadmium sulfide, lead sulfide, zinc sulfide, indium phosphide, copper-indium sulfide ($CuInS_2$), $CuAlO_2$, $SrCu_2O_2$ and their combinations. Among these, titanium oxide, zinc oxide, tin oxide, and niobium oxide are preferable and titanium oxide is particularly preferable in terms of the photoelectric conversion efficiency, stability, and safety. These semiconductor materials may be used in the form of mixtures of two or more of these compounds.

In the present invention, titanium oxide include various kinds of titanium oxide in a narrow sense such as anatase type titanium oxide, rutile type titanium oxide, amorphous titanium oxide, metatitanic acid, orthotitanic acid, titanium hydroxide, hydrated titanium oxide and the like and these compounds may be used alone or in the form of mixtures. Two type crystal systems, the anatase type and rutile type, may be formed in accordance with a production method and heat hysteresis and anatase type is common.

The above-mentioned semiconductor composing the porous semiconductor layer is preferably a polycrystalline sintered body containing fine particles in terms of the stability, easiness of crystal growth, and production cost.

The light scattering property of the porous semiconductor layer can be adjusted in accordance with the particle diameter (average particle diameter) of the semiconductor material to be used for the layer formation.

Although depending on the formation conditions of the porous semiconductor layer, practically, the porous semiconductor layer made of semiconductor particles with a larger average particle diameter has high light scattering property and scatters incident light to improve the light trapping ratio. The porous semiconductor layer made of semiconductor particles with a smaller average particle diameter has low light scattering property and contains more adsorption points of a dye to increase the absorption amount.

Accordingly, it is preferable that two or more porous semiconductor layers are layered in an order of from a layer with a relatively smaller average particle diameter to a layer with a relatively larger average particle diameter from the light receiving face side of the solar cell. In the present invention, "relatively" means comparison of semiconductor particles composing the respective layers of two or more porous semiconductor layers forming the photoelectric conversion layer in a single solar cell.

In terms of efficient achievement of the effects of the present invention, it is preferable that the porous semiconductor layer with the highest light scattering property and having a contact with the counter electrode is formed of semiconductor particles with an average particle diameter of 50 nm or more (preferably 50 nm or more and 600 nm or less) and other porous semiconductor layers are formed of semiconductor particles with an average particle diameter of 5 nm or more and less than 50 nm (preferably 10 nm or more and 30 nm or less).

The average particle diameter of the semiconductor material is not particularly limited if it is in the above-mentioned range proper for achieving the effects of the present invention, however in terms of efficient utilization of the incident light for photoelectric conversion, it is preferable for the semiconductor material to have an even average particle diameter to a certain extent just like commercialized semiconductor material powders.

However, the porous semiconductor layer having higher light scattering property, particularly the porous semiconductor layer having a contact with the counter electrode has low mechanical strength because of the large average particle diameter of the semiconductor material composing the layer and it may sometimes cause a problem in the structure of the solar cell. In such a case, a semiconductor material with a smaller average particle diameter may be added at a ratio, for example, 10% by weight or less to the semiconductor material with a large average particle diameter to mechanically reinforce the porous semiconductor layer.

A method for forming the film-like porous semiconductor layer on a conductive layer is not particularly limited and publicly known methods may be exemplified. Examples may include (1) a method of applying a paste containing semiconductor particles to a conductive layer by a screen printing method, an ink jet method, or the like and the firing the paste; (2) a method of forming a film on a conductive layer by a CVD method or a MOCVD method using desired raw material gases; (3) a method of forming a film on a conductive layer by a PVD method, a vapor deposition method, a sputtering method, or the like using solid raw materials; and (4) a method of forming a film on a conductive layer by a sol-gel method, a method using an electrochemical redox reaction, or the like. Among these methods, the screen printing method using a paste is particularly preferable since a thick porous semiconductor layer can be formed at low cost.

The thickness of the porous semiconductor layer is not particularly limited and is preferably about 0.5 to 50 g m in terms of the photoelectric conversion efficiency.

Particularly, in terms of efficient achievement of the effects of the present invention, it is preferable that the thickness of the porous semiconductor layer with the highest light scattering property and having a contact with the counter electrode is 0.1 to 40 μm (preferably 5 to 20 μm) and the total thickness of other porous semiconductor layers is 0.1 to 50 μm (preferably 10 to 40 μm).

In order to improve the photoelectric conversion efficiency of the solar cell, it is required to form the photoelectric conversion layer by adsorbing a more amount of a dye, which will be described later, in the porous semiconductor layer. Therefore, in the case of film-like porous semiconductor layer, a layer with a high specific surface area is preferable and about 10 to 200 $m^2/g$ is preferable. The specific surface area in this specification is a value measured by a BET adsorption method.

The porous semiconductor layer includes two or more layers and in terms of the efficient achievement of the effects of the present invention, it is more preferable that the porous semiconductor layer includes 3 to 5 layers. That is, a plurality of porous semiconductor layers may be formed using a plurality of particle diameters sufficient for scattering light and reflecting light in accordance with the absorption range of the dye, which will be described later.

A method for forming the porous semiconductor layer using titanium oxide as semiconductor particles will be specifically described.

First, 125 mL of titanium isopropoxide (manufactured by Kishida Chemical Co., Ltd.) is dropwise added to 750 mL of an aqueous 0.1 M nitric acid solution (manufactured by Kishida Chemical Co., Ltd.) to cause hydrolysis and the solution is heated at 80° C. for 8 hours to obtain a sol solution. Thereafter, the obtained sol solution is heated at 230° C. for 11 hours in an autoclave made of titanium to grow titanium oxide particles, and ultrasonic dispersion is carried out for 30 minutes to prepare a colloidal solution containing titanium oxide particles with an average particle diameter (average primary particle diameter) of 15 nm. Next, ethanol in an amount two times as much is added to the obtained colloidal solution and the mixture is centrifuged at a rotation speed of 5000 rpm to obtain titanium oxide particles.

In this specification, the average particle diameter is a value calculated from the diffraction peak of XRD (x-ray diffraction method). Practically, the average particle diameter is calculated from the half width of the diffraction angle in θ/2θ measurement of XRD and Scherrer's equation. For example, in the case of anatase type titanium oxide, the half width of the diffraction peak (around 2θ=25.3°) corresponding to a (101) plane may be measured.

Next, the obtained titanium oxide particles are washed and mixed with a solution obtained by dissolving ethyl cellulose and terpineol in absolute ethanol and stirred to disperse titanium oxide particles. Thereafter, the mixed solution is heated under a vacuum condition to evaporate ethanol and obtain a titanium oxide paste. The final composition is adjusted such that, for example, titanium oxide solid concentration is 20% by weight, ethyl cellulose concentration is 10% by weight, and terpineol concentration is 64% by weight.

Examples of the solvent to be used for preparing a paste containing (suspending) semiconductor particles may include, besides the above-mentioned solvents, glyme type solvents such as ethylene glycol monomethyl ether; alcohol type solvents such as isopropyl alcohol; mixed solvents such as isopropyl alcohol/toluene; water; and the like.

Next, the semiconductor particles-containing paste is applied to the conductive layer and fired by the above-mentioned method to form the porous semiconductor layer. It is required to properly adjust the conditions of drying and firing, such as temperature, time, and ambient environments depending on the types of a support and the semiconductor particles to be used. Firing may be carried out, for example, at from about 50 to 800° C. in atmospheric air or inert gas for 10 seconds to 12 hours. The drying and firing may be carried out at a constant temperature once or at changed temperatures two or more times.

(Dye)

Examples of a dye to be adsorbed in the porous semiconductor layer and having a function as a photo sensitizer may include various organic dyes and metal complex dyes having absorption in various visible light regions and/or infrared regions, and one or more kinds of these dyes may selectively be used.

Examples of the organic dyes include azo type dyes, quinone type dyes, quinoneimine type dyes, quinacridone type dyes, squarylium type dyes, cyanine type dyes, merocyanine type dyes, triphenylmethane type dyes, xanthene type dyes, porphyrin type dyes, perylene type dyes, indigo type dyes, naphthalocyanine type dyes, and the like.

The absorbance index of an organic dye is generally high as compared with that of a metal complex dye having morphology of coordination bond of a molecule to a transition metal.

Examples of the metal complex dyes include those having morphology of coordination bond of molecules to metals such as Cu, Ni, Fe, Co, V, Sn, Si, Ti, Ge, Cr, Zn, Ru, Mg, Al, Pb, Mn, In, Mo, Y, Zr, Nb, Sb, La, W, Pt, Ta, Ir, Pd, Os, Ga, Tb, Eu, Rb, Bi, Se, As, Sc, Ag, Cd, Hf, Re, Au, Ac, Tc, Te, Rh, and the like and among these, phthalocyanine type dyes and ruthenium type dyes are preferable and ruthenium type metal complex dyes are particularly preferable.

In particular, the ruthenium type metal complex dyes represented by the following formulas (1) to (3) are particularly preferable.

[Chemical Formula 1]

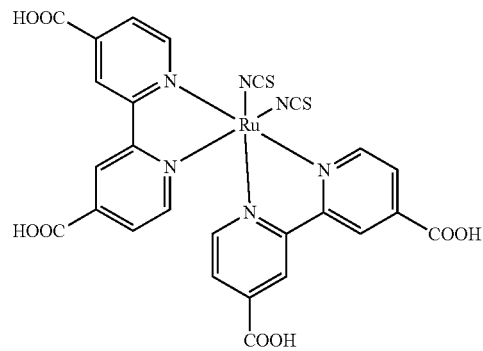

(1)

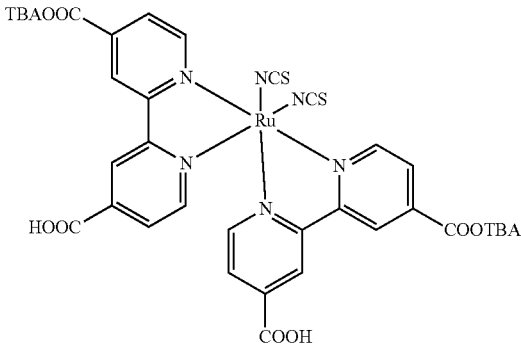

(2)

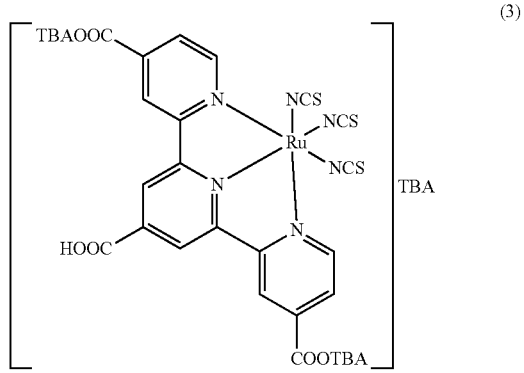

(3)

Further, in order to firmly adsorb a dye in the porous semiconductor layer, the dye is preferable to have an interlocking group such as a carboxylic acid group, a carboxylic anhydride group, an alkoxy group, a hydroxyl group, a hydroxyalkyl group, a sulfonic acid group, an ester group, a mercapto group, a phosphonyl group, and the like. Among these, a carboxylic acid group and a carboxylic anhydride group are particularly preferable. The interlocking group provides an electric bond for making the electron transfer easy between the dye in the excited state and the conduction band of the porous semiconductor layer.

An example of a method for adsorbing the dye in the porous semiconductor layer may be a method involving, for example, immersing the porous semiconductor layer formed on the conductive layer in a solution containing a dye (a solution for adsorbing a dye).

A solvent for dissolving a dye may be any solvent which can dissolve the dye and practical examples may be alcohols such as ethanol; ketones such as acetone; ethers such as diethyl ether and tetrahydrofuran; nitrogen compounds such as acetonitrile; halogenated aliphatic hydrocarbons such as chloroform; aliphatic hydrocarbons such as hexane; aromatic hydrocarbons such as benzene; esters such as ethyl acetate; and water. Two or more of these solvents may be used in the form of mixtures.

The concentration of a dye in the solution may be adjusted properly depending on the types of the dye and the solvent to be used and in order to improve the adsorption, it is more preferable as the concentration is higher and it may be $5 \times 10^{-4}$ mol/L or more.

(Carrier Transporting Material 4)

In the present invention, "charge transporting layer" means a region in which a carrier transporting material 4 is injected and which is surrounded with either a conductive layer 2 in combination with a catalyst layer 5 or a counter electrode conductive layer 6 in combination with a sealing material 8. Accordingly, the photoelectric conversion layer 3 is filled with the carrier transporting material 4.

Such a carrier transporting material is a conductive material capable of transporting ion and preferable materials may be, for example, a liquid electrolyte, a solid electrolyte, a gel electrolyte, a molten salt gel electrolyte, and the like.

The liquid electrolyte may be a liquid substance containing a redox molecule and is not particularly limited if it can be used generally for batteries and solar cells. Specific examples thereof include substances containing a redox molecule and a solvent capable of dissolving the molecule; substances containing a redox molecule and a molten salt capable of dissolving the molecule; and substances containing a redox molecule, a solvent capable of dissolving the molecule, and a molten salt capable of dissolving the molecule; and the like.

Examples of the redox molecule may include $I^-/I_3^-$ type, $Br^{2-}/Br^{3-}$ type, $Fe^{2+}/Fe^{3+}$ type, quinone/hydroquinone type molecules.

Specific examples thereof may include combinations of iodine ($I_2$) with a metal iodine such as lithium iodide (LiI), sodium iodide (NaI), potassium iodide (KI), calcium iodide ($CaI_2$), and the like; combinations of iodine with a tetraalkylammonium salt such as tetraethylammonium iodide (TEAI), tetrapropylammonium iodide (TPAI), tetrabutylammonium iodide (TBAI), tetrahexylammonium iodide (THAI), and the like; and combinations of bromine with a metal bromine such as lithium bromide (LiBr), sodium bromide (NaBr), potassium bromide (KBr), calcium bromide ($CaBr_2$), and the like and among these, the combination of LiI and $I_2$ is particularly preferable.

Examples of the solvent for the redox molecule may include carbonate compounds such as propylene carbonate; nitrile compounds such as acetonitrile; alcohols such as ethanol; water; and non-protonic polar substances. Among these, carbonate compounds and nitrile compounds are particularly preferable. Two or more kinds of these solvents may be used in the form of a mixture.

The solid electrolyte may be a conductive material capable of transporting electron, hole, and ion, usable as an electrolytic substance of solar cells and has no fluidity. Specific examples may include hole transporting materials such as polycarbazole; electron-transporting materials such as tetranitrofluorenone; conductive polymers such as polypyrrole; polymer electrolytes obtained by solidifying liquid electrolytes with polymer compounds; p-type semiconductor such as copper iodide and copper thiocyanide; and electrolytes obtained by solidifying liquid electrolytes containing molten salts by fine particles.

The gel electrolyte generally includes an electrolyte and a gelling agent.

Examples of the gelling agent may include polymer gelling agents such as crosslinked polyacrylic resin derivatives, crosslinked polyacrylonitrile derivatives, polyalkylene oxide derivatives, silicone resins, and polymers having a nitrogen-containing heterocyclic quaternary compound salt structure in the side chains.

The molten salt gel electrolyte generally includes the above-mentioned gel electrolyte and an ambient temperature type molten salt.

Examples of the ambient temperature type molten salt may include nitrogen-containing heterocyclic quaternary ammonium compound salts such as pyridinium salts, imidazolium salts, and the like.

If necessary, an additive may be added to the above-mentioned electrolyte.

Examples of the additive may include nitrogen-containing aromatic compounds such as tert-butylpyridine (TBP), and imidazole salts such as dimethylpropylimidazole iodide (DMPII), methylpropylimidazole iodide (MPII), ethylmethylimidazole iodide (EMII), ethylimidazole iodide (EII), and hexylmethylimidazole iodide (HMII).

The electrolyte concentration in the electrolytic solution is preferably in a range of 0.001 to 1.5 mol/L and more preferably in a range of 0.01 to 0.7 mol/L. In the case where the catalyst layer exists in the light receiving face side in the module of the present invention, incident light reaches the porous semiconductor layer adsorbing a dye through the electrolytic solution to excite carriers. Consequently, depending on the electrolyte concentration to be employed in a unit cell having the catalyst layer in the light receiving face side, the performance may be deteriorated. Therefore, the electrolyte concentration is preferable to be set in consideration of that point.

(Output Electrode 7)

An output electrode 7 is formed based on necessity on the counter electrode conductive layer 6.

The constituent material of the output electrode is not particularly limited if it is generally usable for solar cells and capable of achieving the effects of the present invention.

(Sealing Material 8)

The sealing material 8 is important to prevent evaporation of the electrolytic solution and penetration of the cells with water.

Further, the sealing material is also important (1) to absorb the stress (impact) of dropping object to the support and (2) to absorb sagging of the support for long time use.

The material composing the sealing material 8 is not particularly limited if it is generally usable for solar cells and capable of achieving the effects of the present invention. Such a material are preferably silicone resins, epoxy resins, polyisobutylene type resins, hot melt resins, glass frits and two of more kinds of these materials may be used in the form of two or more layers. In the case where a nitrile type solvent or a carbonate type solvent is used as a solvent for the redox electrolyte, silicone resins, hot melt resins (e.g., ionomer resins), polyisobutylene type resins, and glass frits are particularly preferable.

The patterns of the sealing material 8 can be formed by using a dispenser in the case of using silicone resins, epoxy resins, or glass frits and by forming patterned holes in a sheet-like hot melt resin in the case of using the hot melt resins.

The module of the present invention includes at least two of solar cells including the solar cell of the present invention and connected in series. That is, at least two solar cells composing the module may include at least one solar cell of the present invention among at least two solar cells composing the module.

EXAMPLES

The present invention will be further described by way of Production Examples, Examples, and Comparative Examples; however, it is not intended that the present invention is limited to these Production Examples and Examples.

Production Example 1

A solar cell (unit cell) shown in FIG. 1 was produced.

FIG. 1 is a schematic cross-sectional view of a main part showing the layer structure of a solar cell of the present invention.

In FIG. 1, a reference numeral 1 denotes a support: a reference numeral 2 denotes a conductive layer: a reference numeral 3 denotes a photoelectric conversion layer filled with a carrier transporting material: a reference numeral 4 denotes a carrier transporting material: a reference numeral 5 denotes a catalyst layer: a reference numeral 6 denotes a counter electrode conductive layer: a reference numeral 7 denotes an output electrode: and a reference numeral 8 denotes a sealing material.

A glass substrate (trade name: $SnO_2$ film-bearing glass, manufactured by Nippon Sheet Glass Co., Ltd.) obtained by forming a conductive layer 2 of a $SnO_2$ film on a glass support 1 was used. A commercialized titanium oxide paste (trade name: Ti-Nanoxide T/SP, average primary particle diameter of titanium oxide: 13 nm, manufactured by Solaronix) was applied to the conductive layer 2 of this glass substrate by using a screen printing apparatus (model No.: LS-150, manufactured by Newlong Seimitsu Kogyo Co., Ltd.). Next, the paste was fired at 500° C. for 40 minutes in air using a firing furnace (model No.: KDF P-100, manufactured by Denken Co., Ltd.) to form a 8 μm-thick titanium oxide layer A (a porous semiconductor layer with the lowest light scattering property).

Further, using the above-mentioned screen printing apparatus, a commercialized titanium oxide paste (trade name: Ti-Nanoxide D/SP, average primary particle diameter of titanium oxide: 13 nm, manufactured by Solaronix) was applied to the titanium oxide layer A and fired at 500° C. for 40 minutes in air using the firing furnace. The application and firing processes were repeated three times to form a 18 μm-thick titanium oxide layer B (a porous semiconductor layer with a middle light scattering property).

Further, using the above-mentioned screen printing apparatus, a previously prepared titanium oxide paste was applied to the titanium oxide layer B and fired at 500° C. for 40 minutes in air using the firing furnace to form a 5 μm-thick titanium oxide layer C (a porous semiconductor layer with the highest light scattering property).

The titanium oxide paste was prepared by using anatase type titanium oxide particles with an average primary particle diameter of 350 nm and terpineol as a solvent.

In these processes, three porous semiconductor layers were formed in an order of from a layer with the lower light scattering property to a layer with the higher light scattering property from the conductive layer 2.

A catalyst layer 5 was formed on the obtained porous semiconductor layers by vapor deposition of platinum in a thickness of 50 nm using a vapor deposition apparatus (model No.: EVD 500A, manufactured by ANELVA corporation).

Next, using the above-mentioned vapor deposition apparatus, titanium in a thickness of 300 nm was vapor-deposited to form a counter electrode conductive layer 6.

The porous semiconductor layers formed by layering the layers in the above-mentioned manner were immersed in a previously prepared dye solution for adsorption at room temperature for 24 hours to adsorb the dye in the porous semiconductor layers. Thereafter, the substrate was washed with ethanol and dried at about 60° C. for about 5 minutes to form the photoelectric conversion layer 3.

The dye solution for adsorption was obtained by dissolving the dye represented by the above-mentioned formula (3) (trade name: Ruthenium 620, manufactured by Solaronix) in a solvent mixture of acetonitrile and tert-butanol at volume ratio of 1:1 so as to be a concentration of $3 \times 10^{-4}$ mol/L.

A 0.5 mm-thick titanium sheet having an electrolytic solution injection port was used as the output electrode 7. While the output electrode 7 was stuck to the counter electrode conductive layer 6 and kept in pressurized state, a UV-curable resin (model No.: 31X-101, manufactured by Three Bond Co., Ltd.) was applied to the surrounding of the obtained body using a dispenser (trade name: ULTRA-SAVER, manufactured by EFD corporation). Next, UV rays were quickly radiated to cure the resin and thus form the sealing material 8 by using a UV lamp (trade name: NOVA-CURE, manufactured by EFD corporation).

Thereafter, utilizing the capillary effect, a previously prepared electrolytic solution as a carrier transporting material 4 was injected in the electrolytic solution injection port of the output electrode 7 and the electrolytic solution injection port was sealed to complete a solar cell.

The electrolytic solution was obtained by dissolving 0.1 mol/L of LiI (manufactured by Aldrich Chemical Company), 0.05 mol/L of $I_2$ (manufactured by Aldrich Chemical Company), 0.5 mol/L of TBP (manufactured by Aldrich Chemical Company), and 0.6 mol/L of dimethylpropylimidazole iodide (DMPII, manufactured by Shikoku Chemicals Corporation) in acetonitrile (manufactured by Aldrich Chemical Company).

Production Example 2

Figure 2:
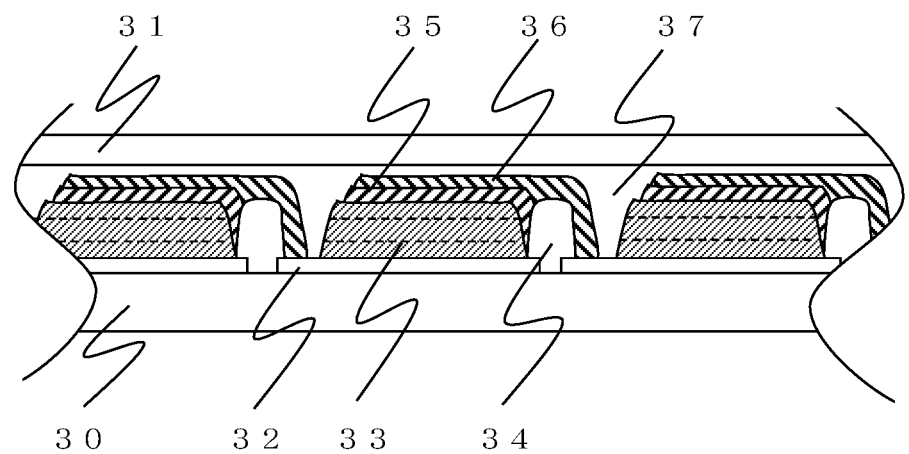
FIG. 2 is a schematic cross-sectional view of a main part showing a layer structure of a dye-sensitized solar cell module according to the present invention (Production Example 2).

A solar cell module shown in FIG. 2 was produced.

FIG. 2 is a schematic cross-sectional view of a main part showing a layer structure of a solar cell module of the present invention. In the drawing, a reference numeral 30 denotes a support: a reference numeral 31 denotes a cover: a reference numeral 32 denotes a conductive layer: a reference numeral 33 denotes a photoelectric conversion layer filled with a carrier transporting material: a reference numeral 34 denotes an inter-cell insulating layer: a reference numeral 35 denotes a catalyst layer: a reference numeral 36 denotes a counter electrode conductive layer: and a reference numeral 37 denotes an insulating layer.

A glass substrate (trade name: $SnO_2$ film-bearing glass, manufactured by Nippon Sheet Glass Co., Ltd.) obtained by forming a conductive layer 32 of a $SnO_2$ film on a glass support 1 was used. A scribe line was formed in a prescribed site of the conductive layer 32 of the glass substrate by radiating laser beam and evaporating the $SnO_2$ film using a laser scribe apparatus (manufactured by Seishin Trading Co., Ltd.) comprising YAG laser (basic wavelength: 1.06 μm).

Next, in the same manner as in Production Example 1, the porous semiconductor layer was formed using commercialized titanium oxide pastes. Thereafter, a glass paste (trade name: glass paste, manufactured by Noritake Co., Ltd.) was applied on the scribe lines existing in the respective neighboring porous semiconductor layers by using a screen printing apparatus (model No.; LS-150, manufactured by Newlong Seimitsu Kogyo Co., Ltd.) and dried at 100° C. for 15 minutes and then fired at 500° C. for 60 minutes using a firing furnace to form the inter-cell insulating layers 34.

Next, in the same manner as in Production Example 1, the catalyst layer 35 and the counter electrode conductive layer 36 were formed. Thereafter, in the same manner as in Production Example 1, the dye represented by the above-mentioned formula (3) was adsorbed in the porous semiconductor layers layered in the above-mentioned manner to form the photoelectric conversion layer 33. Further, a PET (polyethylene terephthalate) sheet as the cover 31 and an EVA (ethylene vinyl acetate) sheet as the insulating layer 37 were stuck to prescribed parts.

Thereafter, in the same manner as in Production Example 1, an electrolytic solution was injected and the electrolytic solution injection port was sealed to complete a solar cell module.

Production Example 3

Figure 3:
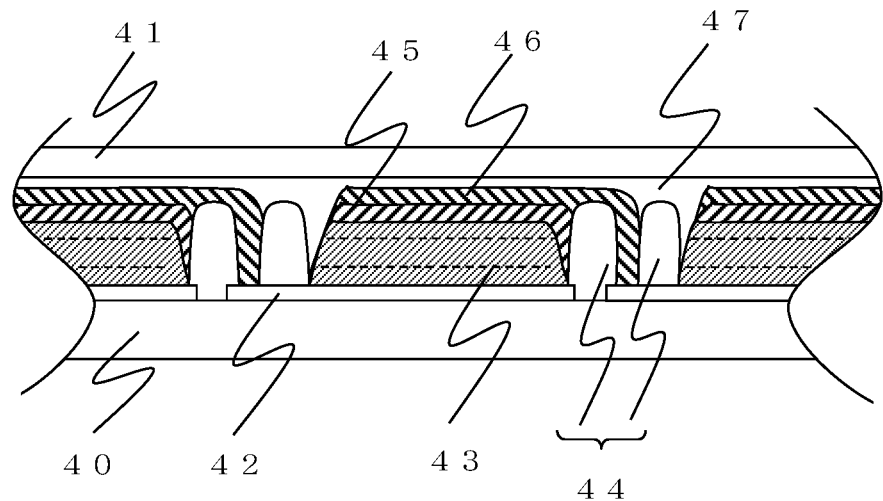
FIG. 3 is a schematic cross-sectional view of a main part showing a layer structure of the dye-sensitized solar cell module according to the present invention (Production Example 3).

A solar cell module shown in FIG. 3 was produced.

FIG. 3 is a schematic cross-sectional view of a main part showing a layer structure of a solar cell module of the present invention. In the drawing, a reference numeral 40 denotes a support: a reference numeral 41 denotes a cover: a reference numeral 42 denotes a conductive layer: a reference numeral 43 denotes a photoelectric conversion layer filled with a carrier transporting material: a reference numeral 44 denotes an inter-cell insulating layer: a reference numeral 45 denotes a catalyst layer: a reference numeral 46 denotes a counter electrode conductive layer: and a reference numeral 47 denotes an insulating layer.

A solar cell module was completed in the same manner as in Production Example 2, except that after the porous semiconductor layers were formed, two rows of the inter-cell insulating layers 44 were formed an thereafter, the counter electrode conductive layer 46 was formed between the inter-cell insulating layers 44 to connect neighboring solar cells in series.

Production Example 4

Figure 4:
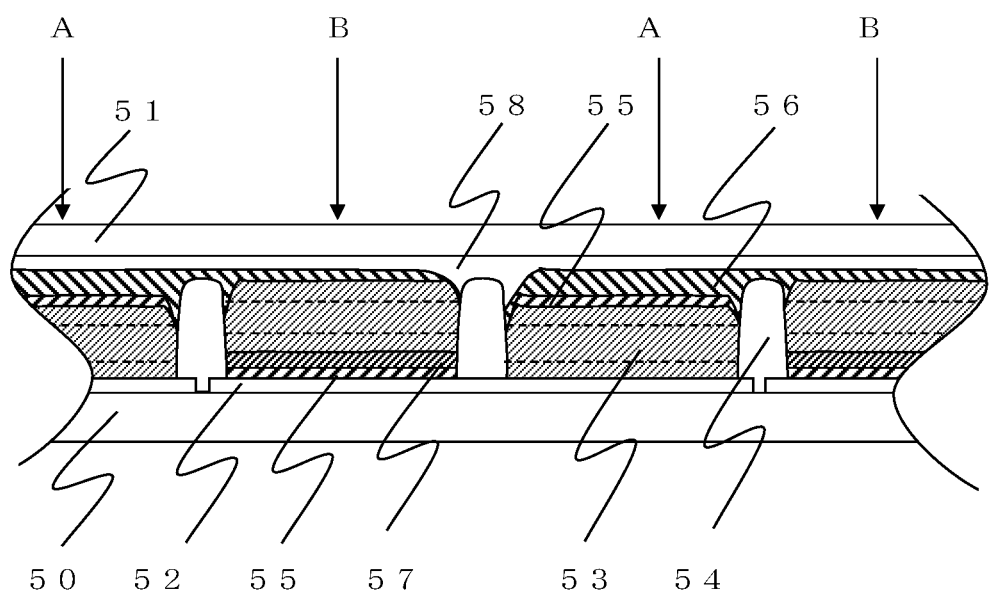
FIG. 4 is a schematic cross-sectional view of a main part showing a layer structure of the dye-sensitized solar cell module according to the present invention (Production Example 4).

A solar cell module shown in FIG. 4 was produced.

FIG. 4 is a schematic cross-sectional view of a main part showing a layer structure of a solar cell module of the present invention. In the drawing, a reference numeral 50 denotes a support: a reference numeral 51 denotes a cover: a reference numeral 52 denotes a conductive layer: a reference numeral 53 denotes a photoelectric conversion layer filled with a carrier transporting material: a reference numeral 54 denotes an inter-cell insulating layer: a reference numeral 55 denotes a catalyst layer: a reference numeral 56 denotes a counter electrode conductive layer: a reference numeral 57 denotes a porus insulating layer: a reference numeral 58 denotes an insulating layer: A denotes a cell A and B denotes a cell B.

A glass substrate (trade name: $SnO_2$ film-bearing glass, manufactured by Nippon Sheet Glass Co., Ltd.) obtained by forming a conductive layer 52 of a $SnO_2$ film on a glass support 50 was used. A scribe line was formed in a prescribed site of the conductive layer 52 of the glass substrate by radiating laser beam and evaporating the $SnO_2$ film using a laser scribe apparatus (manufactured by Seishin Trading Co., Ltd.) comprising YAG laser (basic wavelength: 1.06 μm).

Next, a commercialized catalyst paste (Pt-catalyst T/SP, manufactured by Solaronix) was applied to the conductive layer 52 of the cell B by using a screen printing apparatus (model No.: LS-150, manufactured by Newlong Seimitsu Kogyo Co., Ltd.). Next, the paste was fired at 500° C. for 30 minutes in air using a firing furnace (model No.: KDF P-100, manufactured by Denken Co., Ltd.) to form a 1 μm-thick catalyst layer 55 of the cell B.

Further, a previously prepared silicon oxide paste was applied to the conductive layer 55 of the cell B and fired at 500° C. for 60 minutes in air using the above-mentioned firing furnace to form a 5 μm-thick porous insulating layer 57.

The silicon oxide paste was prepared by using silicon oxide particles (manufactured by C.I. Kasei Co., Ltd.) with an average primary particle diameter of 30 nm and terpineol as a solvent.

The porous insulating layer 57 may be formed by a sol-gel method other than the above-mentioned method. For example, an organic silicon compound (e.g., tetramethoxysilane, tetraethoxysilane, and the like), ethanol, and hydrochloric acid are dissolved in a solvent such as pure water to produce a sol solution and further, polyethylene glycol (molecular weight about 2000) as a polymer compound is added in a concentration of about 40% by weight to the obtained sol solution. The obtained mixed solution was applied to the catalyst layer 55 of the cell B and dried and successively fired at 500° C. for about 30 minutes in air to form the porous insulating layer 57. The above-mentioned polymer compound has a function of improving the porosity (specific surface area) of the porous insulating layer and may include, for example, ethyl cellulose, nitrocellulose and the like, besides polyethylene glycol.

Next, in the same manner as in Production Example 1, porous semiconductor layers were formed using commercialized titanium oxide pastes on the conductive layer 52 of the cell A and the porous insulating layer 57 of the cell B. Thereafter, a glass paste (trade name: glass paste, manufactured by Noritake Co., Ltd.) was applied on the scribe lines existing in the respective neighboring porous semiconductor layers by using a screen printing apparatus (model No.; LS-150, manufactured by Newlong Seimitsu Kogyo Co., Ltd.) and dried at 100° C. for 15 minutes and then fired at 500° C. for 60 minutes using a firing furnace to form the inter-cell insulating layers 54.

Next, in the same manner as in Production Example 1, the catalyst layer 55 was formed on the porous semiconductor layers of the cell A and the counter electrode conductive layer 56 was formed on the catalyst layer 55 of the cell A and the porous semiconductor layers of the cell B. Thereafter, in the same manner as in Production Example 1, the dye represented by the above-mentioned formula (3) was adsorbed in the porous semiconductor layers layered in the above-mentioned manner to form the photoelectric conversion layer 53. Further, a PET (polyethylene terephthalate) sheet as the cover 51 and an EVA (ethylene vinyl acetate) sheet as the insulating layer 58 were stuck to prescribed parts.

Thereafter, in the same manner as in Production Example 1, an electrolytic solution was injected and the electrolytic solution injection port was sealed to complete a solar cell module.

Figure 5:
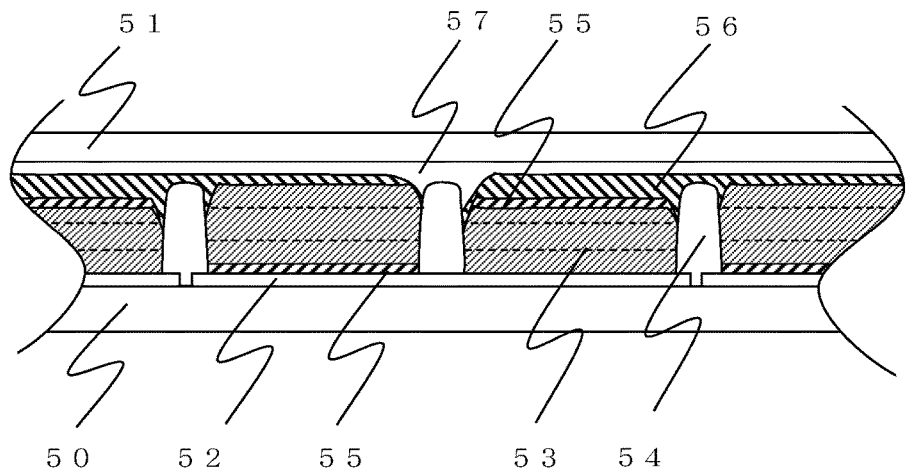
FIG. 5 is a schematic cross-sectional view of a main part explaining a layer structure of the dye-sensitized solar cell module according to the present invention (Production Example 4).

In this Production Example 4, to efficiently utilize the incident light for photoelectric conversion, the porous semiconductor layers of the cell A and cell B were layered in order of a layer with a lower light scattering property and a layer with a higher light scattering property from the light receiving face side. In this connection, if the porous semiconductor layer with a lower light scattering layer was directly formed on the catalyst layer in the cell B (see FIG. 5), a problem of leakage between the porous semiconductor layer and the catalyst layer could occur, the porous insulating layer 57 was inserted between the porous semiconductor layer and the catalyst layer.

The porous insulating layer may be formed using a material which can substantially transmit light with wavelength to which at least the sensitizing dye has practically effective sensitivity and does not necessarily a material having the transmittance to light in the entire wavelength region.

Example 1

In accordance with Production Example 1, a solar cell (unit cell) shown in FIG. 1 and having a light receiving surface area of 5 mm×50 mm in the photoelectric conversion layer filled with the carrier transporting material was produced. The porous semiconductor layer having the highest light scattering property of this solar cell contained anatase type titanium oxide particles with an average primary particle diameter of 350 nm.

A black mask having an aperture part surface area of 2.49 cm$^2$ was set on the light receiving face of the obtained solar cell and light of an intensity of 1 kW/m$^2$ (AM 1.5 solar simulator) was radiated to the solar cell to measure the short-circuit current, open circuit voltage, FF (fill factor), and photoelectric conversion efficiency (sometimes referred to simply as "conversion efficiency"). The results are shown in Table 1.

Example 2

A solar cell was produced in the same manner as in Example 1, except that anatase type titanium oxide particles with an average primary particle diameter of 150 nm were used for forming the porous semiconductor layer having contact with the catalyst layer, that is, the porous semiconductor layer with the highest light scattering property and the solar cell was evaluated. The results are shown in Table 1.

Example 3

A solar cell was produced in the same manner as in Example 1, except that rutile type titanium oxide particles with an average primary particle diameter of 300 nm (manufactured by Sakai Chemical Industry Co., Ltd.) were used for forming the porous semiconductor layer having contact with the catalyst layer, that is, the porous semiconductor layer with the highest light scattering property and the solar cell was evaluated. The results are shown in Table 1.

Example 4

A solar cell was produced in the same manner as in Example 1, except that rutile type titanium oxide particles with an average primary particle diameter of 100 nm (manufactured by Sakai Chemical Industry Co., Ltd.) were used for forming the porous semiconductor layer having contact with the catalyst layer, that is, the porous semiconductor layer with the highest light scattering property and the solar cell was evaluated. The results are shown in Table 1.

Example 5

A solar cell was produced in the same manner as in Example 1, except that rutile type titanium oxide particles with an average primary particle diameter of 50 nm (manufactured by Sakai Chemical Industry Co., Ltd.) were used for forming the porous semiconductor layer having contact with the catalyst layer, that is, the porous semiconductor layer with the highest light scattering property and the solar cell was evaluated. The results are shown in Table 1.

Example 6

A solar cell was produced in the same manner as in Example 1, except that a mixture of anatase type titanium oxide particles with average primary particle diameters of 10 nm and 350 nm (both manufactured by Sakai Chemical Industry Co., Ltd.) at a weight ratio of 1:9 was used for forming the porous semiconductor layer having contact with the catalyst layer, that is, the porous semiconductor layer with the highest light scattering property and the solar cell was evaluated. The results are shown in Table 1.

Comparative Example 1

A solar cell was produced in the same manner as in Example 1, except that zirconium oxide particles with an average primary particle diameter of 50 nm (manufactured by Sakai Chemical Industry Co., Ltd.) were used for forming the porous insulating layer instead of the porous semiconductor layer having contact with the catalyst layer, that is, the porous semiconductor layer with the highest light scattering property and the solar cell was evaluated. The results are shown in Table 1.

Comparative Example 2

A solar cell was produced in the same manner as in Example 1, except that no porous semiconductor layer having contact with the catalyst layer, that is, the porous semiconductor layer with the highest light scattering property was formed, that is, the porous semiconductor layer with a two-layer structure of a titanium oxide layer A and a titanium oxide layer B as shown in Production Example 1 was employed and the solar cell was evaluated. The results are shown in Table 1.

Comparative Example 3

Figure 9:
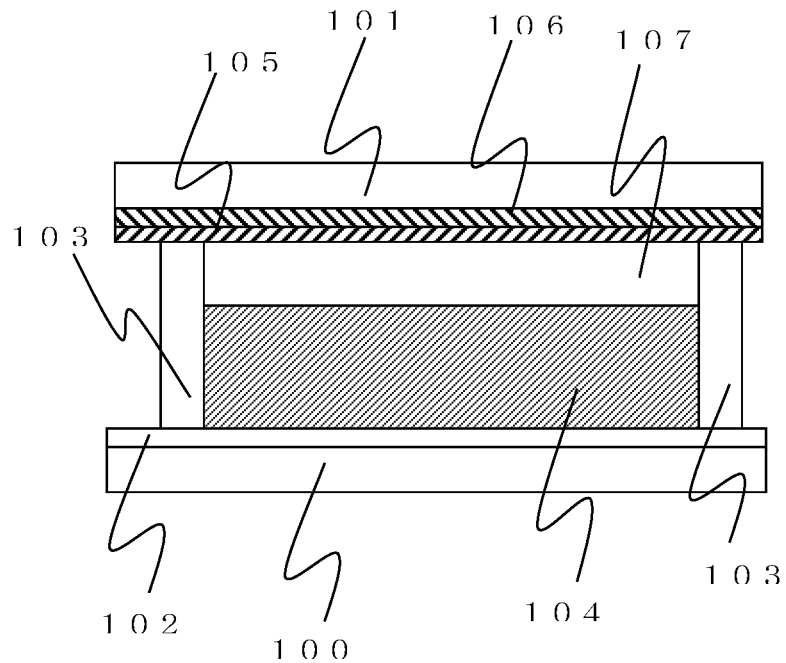
FIG. 9 is a schematic cross-sectional view of a main part showing a layer structure of a conventional dye-sensitized solar cell (Patent Document 1).
Figure 10:
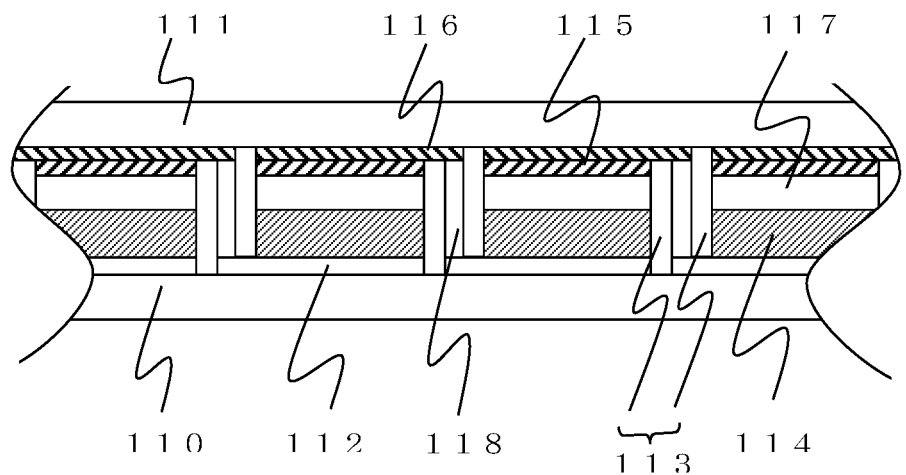
FIG. 10 is a schematic cross-sectional view of a main part showing a layer structure of a conventional dye-sensitized solar cell module (Patent Document 2).
Figure 11:
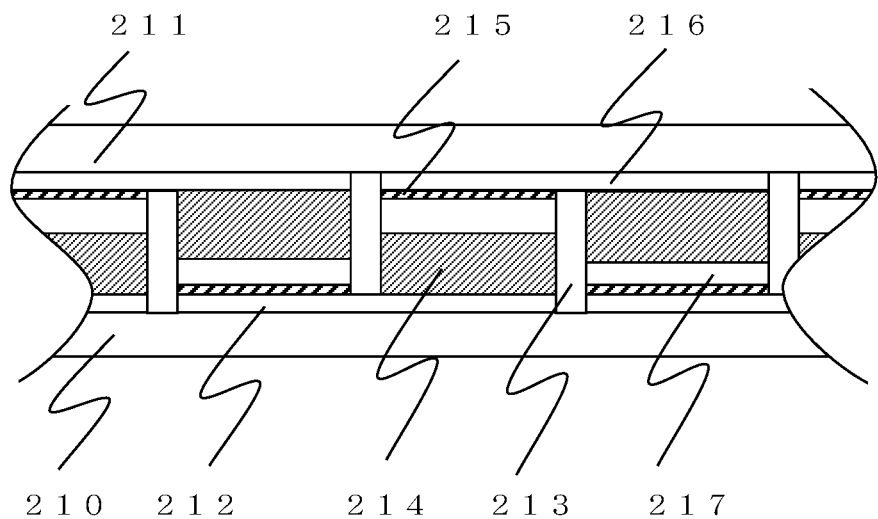
FIG. 11 is a schematic cross-sectional view of a main part showing a layer structure of a conventional dye-sensitized solar cell module (Non-Patent Document 1).
Figure 12:
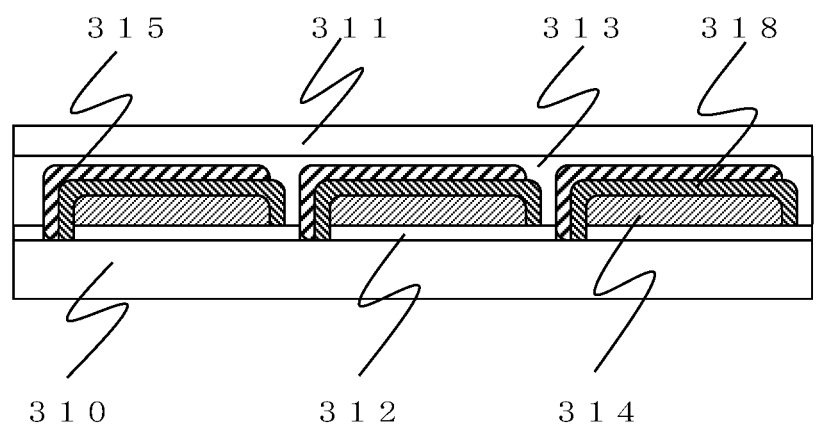
FIG. 12 is a schematic cross-sectional view of a main part showing a layer structure of a conventional dye-sensitized solar cell module (Patent Document 3).
Figure 13:
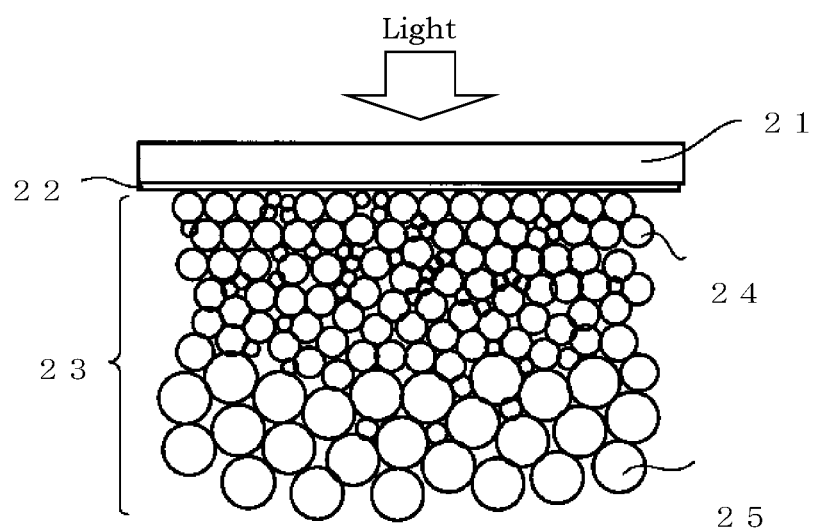
FIG. 13 is a schematic cross-sectional view showing a layer structure of a porous semiconductor layer in a conventional dye-sensitized solar cell (Patent Document 5).

A solar cell having a conventional structure in which the photoelectric conversion layer was not brought into contact with the counter electrode as shown in FIG. 9 was produced by using the porous semiconductor layer having a three-layer structure of the porous semiconductor layer of the solar cell of Example 1, that is, the porous semiconductor layer having contact with the catalyst layer, that is, the porous semiconductor layer with the highest light scattering property as the porous semiconductor layer composing the photoelectric conversion layer and the solar cell was evaluated in the same manner as in Example 1.

In the conductive layer 102 side, a glass substrate (trade name: SnO$_2$ film-bearing glass, manufactured by Nippon Sheet Glass Co., Ltd.) obtained by forming a conductive layer 102 of a SnO$_2$ film on a glass support 100 was used. Further, in the counter electrode conductive layer 106 side, a glass substrate (trade name: SnO$_2$ film-bearing glass, manufactured by Nippon Sheet Glass Co., Ltd.) obtained by forming a counter electrode conductive layer 106 of a SnO$_2$ film on a glass support 101 was used and a platinum layer with a thickness of 300 nm was deposited as the catalyst layer 105 by vapor deposition on the counter electrode conductive layer 106 was used. Other than these parts, the formation conditions of the sealing material 103, the photoelectric conversion layer 104, and the charge transporting layer (electrolytic solution) were same as described in Example 1.

TABLE 1

|  | short-circuit current (mA) | Open circuit voltage (V) | FF | conversion efficiency (%) | Masking area (cm$^2$) |
|---|---|---|---|---|---|
| Example 1 | 40.0 | 0.680 | 0.670 | 7.32 | 2.49 |
| Example 2 | 39.7 | 0.668 | 0.669 | 7.13 | 2.49 |
| Example 3 | 41.2 | 0.675 | 0.665 | 7.43 | 2.49 |
| Example 4 | 39.8 | 0.672 | 0.690 | 7.41 | 2.49 |
| Example 5 | 39.7 | 0.675 | 0.685 | 7.37 | 2.49 |
| Example 6 | 39.8 | 0.679 | 0.672 | 7.29 | 2.49 |
| Comparative Example 1 | 39.8 | 0.669 | 0.650 | 6.95 | 2.49 |
| Comparative Example 2 | 31.0 | 0.652 | 0.663 | 5.38 | 2.49 |
| Comparative Example 3 | 40.1 | 0.665 | 0.656 | 7.03 | 2.49 |

From the results shown in Table 1, as compared with the solar cell of Comparative Example 2, the solar cells of Examples 1 to 6 were found having higher short-circuit current, open circuit voltage and photoelectric conversion efficiency. Further, although having no porous insulating layer, the solar cells of Examples 1 to 6 were found showing short-circuit current and open circuit voltage at same levels as those of the solar cells of Comparative Examples 1 and 3.

Accordingly, it can be understood that the solar cells of Examples 1 to 6 show short-circuit current and open circuit voltage at same levels as those of the solar cells of conventional techniques although having no porous insulating layer which is formed in the conventional techniques and due to no formation of the porous insulating layer, FF can be improved and as a result, the solar cells of the present invention have a higher conversion efficiency than that of the solar cells of conventional techniques just like Comparative Examples 1 to 3.

Example 7

Figure 6:
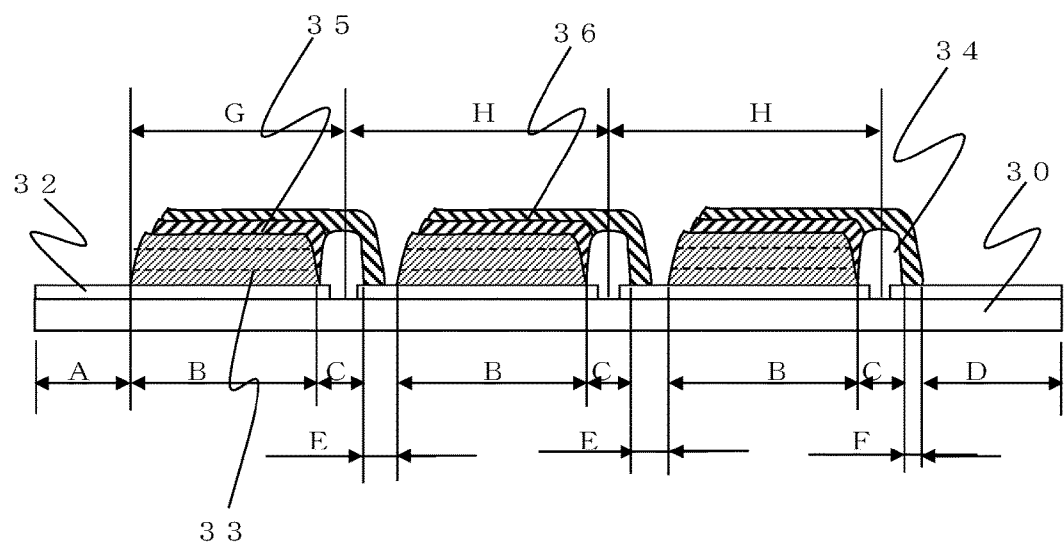
FIG. 6 is a schematic cross-sectional view of a main part showing a layer structure of the dye-sensitized solar cell module according to the present invention (Example 7).

Based on Production Example 2, a solar cell module comprising three rows as shown in FIG. 6 and having a light receiving surface area of 5 mm×50 mm of the photoelectric conversion layer filled with the carrier transporting material was produced.

FIG. 6 is a schematic cross-sectional view of a main part showing a layer structure of a solar cell module of the present invention and in the drawing, a reference numeral 30 denotes a support: a reference numeral 32 denotes a conductive layer: a reference numeral 33 denotes the photoelectric conversion layer filled with the carrier transporting material: a reference numeral 34 denotes an inter-cell insulating layer: a reference numeral 35 denotes a catalyst layer and a reference numeral 36 denotes a counter electrode conductive layer.

Further, the size in the drawing was set as follows: A 10 mm; B 5 mm; C 0.5 mm; D 11 mm; E 1 mm; F 0.5 mm; G 5.25 mm; and H 6.5 mm.

A black mask having an aperture part surface area of 9.0 cm$^2$ was set on the light receiving face of the obtained solar module and light of an intensity of 1 kW/m$^2$ (AM 1.5 solar simulator) was radiated to the solar cell module to measure the short-circuit current, open circuit voltage, FF (fill factor), and photoelectric conversion efficiency (sometimes referred to simply as "conversion efficiency"). The results are shown in Table 2.

Example 8

Figure 7:
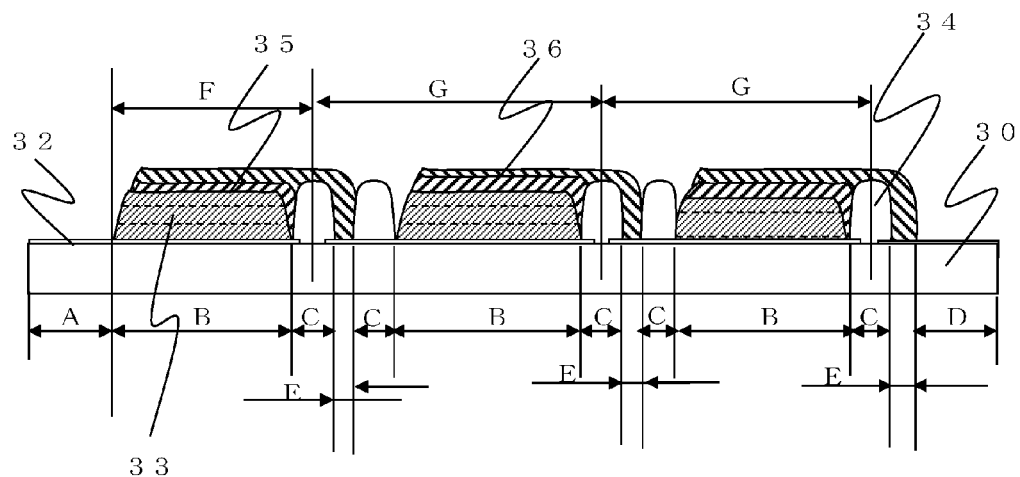
FIG. 7 is a schematic cross-sectional view of a main part showing a layer structure of the dye-sensitized solar cell module according to the present invention (Example 8).

Based on Production Example 3, a solar cell module comprising three rows as shown in FIG. 7 and having a light receiving surface area of 5 mm×50 mm of the photoelectric conversion layer filled with the carrier transporting material was produced.

FIG. 7 is a schematic cross-sectional view of a main part showing a layer structure of a solar cell module of the present invention and in the drawing, a reference numeral 30 denotes a support: a reference numeral 32 denotes a conductive layer: a reference numeral 33 denotes the photoelectric conversion layer filled with the carrier transporting material: a reference numeral 34 denotes an inter-cell insulating layer: a reference numeral 35 denotes a catalyst layer: and a reference numeral 36 denotes a counter electrode conductive layer.

Further, the size in the drawing was set as follows: A 10 mm; B 5 mm; C 0.5 mm; D 11 mm; E 0.5 mm; F 5.25 mm; and G 6.5 mm.

The obtained solar cell module was evaluated in the same manner as in Example 7. The results are shown in Table 2.

Example 9

Figure 8:
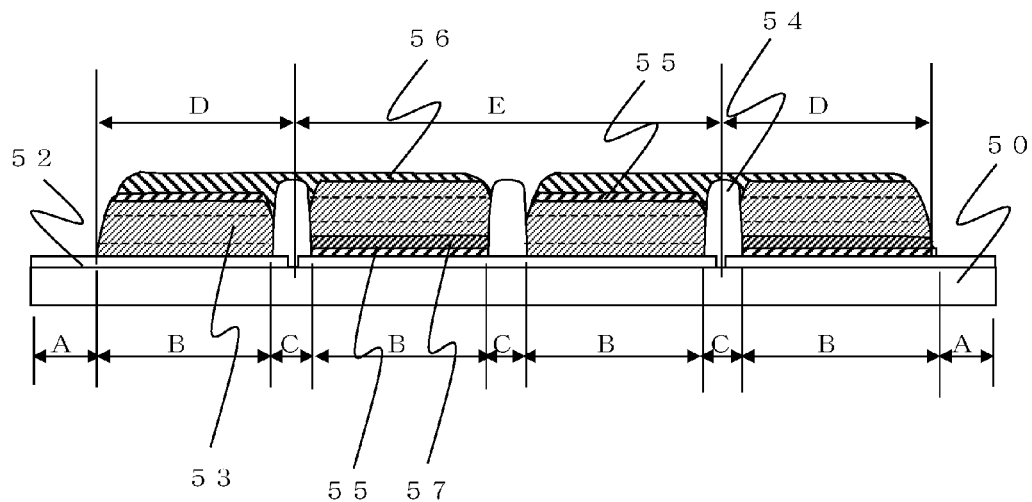
FIG. 8 is a schematic cross-sectional view of a main part showing a layer structure of the dye-sensitized solar cell module according to the present invention (Example 9).

Based on Production Example 4, a solar cell module comprising four rows as shown in FIG. 8 and having a light receiving surface area of 5 mm×50 mm of the photoelectric conversion layer filled with the carrier transporting material was produced.

FIG. 8 is a schematic cross-sectional view of a main part showing a layer structure of a solar cell module of the present invention and in the drawing, a reference numeral 50 denotes a support: a reference numeral 52 denotes a conductive layer: a reference numeral 53 denotes the photoelectric conversion layer filled with the carrier transporting material: a reference numeral 54 denotes an inter-cell insulating layer: a reference numeral 55 denotes a catalyst layer: and a reference numeral 56 denotes a counter electrode conductive layer.

Further, the size in the drawing was set as follows: A 10 mm; B 5 mm; C 0.5 mm; D 5.25 mm; and E 36 mm.

The obtained solar cell module was evaluated in the same manner as in Example 7. The results are shown in Table 2.

TABLE 2

|  | short-circuit current (mA) | Open circuit voltage (V) | FF | conversion efficiency (%) | Masking area (cm$^2$) |
|---|---|---|---|---|---|
| Example 7 | 39.2 | 2.01 | 0.585 | 5.12 | 9.0 |
| Example 8 | 40.3 | 2.00 | 0.580 | 5.19 | 9.0 |
| Example 9 | 41.1 | 2.69 | 0.594 | 6.11 | 10.75 |

From the results shown in Table 2, the solar cell modules of Examples 7 to 9 were found having conversion efficiency as high as that of the solar cells of Examples 1 to 6.

While the present invention has been described above, the description is illustrative of the present invention and is not to be construed as limiting the present invention and it will be appreciated that many modifications and variants can be made. The various modifications and applications may occur to those skilled in the art without departing from the true spirit and scope of the present invention as defined by the appended claims.

The invention claimed is:

1. A dye-sensitized solar cell comprising;
a substrate,
two or more light transmitting conductive layers provided on the substrate,
a first light transmitting conductive layer which is one of the two or more light transmitting conductive layers,
a second light transmitting conductive layer which is one of the two or more light transmitting conductive layers and provided adjacent to the first light transmitting conductive layer and on the substrate,
a first insulating layer provided on the substrate between the first light transmitting conductive layer and the second light transmitting conductive layer,
a first porous semiconductor layer including first semiconductor particles and a first dye, and provided on the first light transmitting layer,
a second porous semiconductor layer including second semiconductor particles, and provided on the first porous semiconductor layer, and
a first counter electrode including a counter conductive layer and provided on the second porous semiconductor layer and the insulating layer, and the counter conductive layer connected to the second light transmitting conductive layer.

2. The dye-sensitized solar cell according to claim 1, further comprising;
a third porous semiconductor layer including third semiconductor particles and a second dye, and provided on the second light transmitting conductive layer,
a forth porous semiconductor layer including forth semiconductor particles and provided on the third porous semiconductor layer, and
a second counter electrode provided on the forth porous semiconductor layer.

3. The dye-sensitized solar cell according to claim 2, further comprising a second insulating layer provided on a portion of the first light transmitting conductive layer, a portion of the second light transmitting conductive layer, the first counter electrode and the second counter electrode, and a cover supported by the a insulating layer.

4. The dye-sensitized solar cell according to claim 1, wherein an average particle diameter of the first semiconductor particles is smaller than an average particle diameter of the second semiconductor particles.

5. The dye-sensitized solar cell according to claim 1, wherein an average particle diameter of the first semiconductor particles is 5 nm or more and less than 50 nm.

6. The dye-sensitized solar cell according to claim 1, wherein an average particle diameter of the second semiconductor particles is 50 nm or more and less than 600 nm.

7. The dye-sensitized solar cell according to claim 1, wherein the first insulating layer is derived from a glass paste.

8. The dye-sensitized solar cell according to claim 1, further comprising, a catalyst layer included in the first counter electrode arranged between the second porous semiconductor layer and the first counter electrode.

9. The dye-sensitized solar cell according to claim 1, wherein a thickness of the second porous semiconductor layer is 0.1 to 40 μm.

10. The dye-sensitized solar cell according to claim 1, wherein an average particle diameter of the first semiconductor particles is 5 nm or more and less than 50 nm, and an average particle diameter of the second semiconductor particles is 50 nm or more and less than 600 nm.

11. The dye-sensitized solar cell according to claim 1, further comprising a second insulating layer provided on a portion of the first light transmitting conductive layer and a portion of the second light transmitting conductive layer and a cover supported by the a insulating layer.

12. The dye-sensitized solar cell according to claim 11, wherein the second insulating layer provided between the first counter electrode and the cover.

13. The dye-sensitized solar cell according to claim 11, wherein the first counter electrode is not in contact with the cover.

14. The dye-sensitized solar cell according to claim 1, wherein the first semiconductor particles is at least one of group consisting of titanium oxide, zinc oxide, tin oxide, iron oxide, niobium oxide, cerium oxide, tungsten oxide, nickel oxide, strontium titanate, cadmium sulfide, lead sulfide, zinc sulfide, indium phosphide, copper-indium sulfide ($CuInS_2$), $CuAlO_2$ and $SrCu_2O_2$, the second semiconductor particles is at least one of group consisting of titanium oxide, zinc oxide, tin oxide, iron oxide, niobium oxide, cerium oxide, tungsten oxide, nickel oxide, strontium titanate, cadmium sulfide, lead sulfide, zinc sulfide, indium phosphide, copper-indium sulfide ($CuInS_2$), $CuAlO_2$ and $SrCu_2O_2$.

* * * * *